United States Patent
Greeff

(10) Patent No.: US 7,730,209 B2
(45) Date of Patent: Jun. 1, 2010

(54) EFFICIENT DISPATCH OF MESSAGES BASED ON MESSAGE HEADERS

(75) Inventor: Esaias E Greeff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 11/275,597

(22) Filed: Jan. 18, 2006

(65) Prior Publication Data

US 2007/0168546 A1 Jul. 19, 2007

(51) Int. Cl.
G06F 15/173 (2006.01)
G06F 15/16 (2006.01)
G06F 3/00 (2006.01)

(52) U.S. Cl. .................. 709/245; 709/230; 709/238; 710/3

(58) Field of Classification Search ......... 709/223–224, 709/230, 238, 245; 710/3
See application file for complete search history.

(56) References Cited

U.S. PATENT DOCUMENTS

| | | | |
|---|---|---|---|
| 6,212,183 B1 * | 4/2001 | Wilford | 370/392 |
| 6,424,650 B1 * | 7/2002 | Yang et al. | 370/390 |
| 6,449,256 B1 * | 9/2002 | Varghese et al. | 370/238 |
| 6,563,823 B1 * | 5/2003 | Przygienda et al. | 370/392 |
| 6,678,269 B1 * | 1/2004 | Michels et al. | 370/389 |
| 7,080,135 B1 * | 7/2006 | Williams | 709/223 |
| 7,103,035 B1 * | 9/2006 | Kanuri | 370/356 |
| 7,325,059 B2 * | 1/2008 | Barach et al. | 709/225 |
| 7,457,870 B1 * | 11/2008 | Lownsbrough et al. | 709/224 |
| 2003/0061507 A1 * | 3/2003 | Xiong et al. | 713/201 |
| 2003/0226032 A1 * | 12/2003 | Robert | 713/200 |
| 2005/0198531 A1 * | 9/2005 | Kaniz et al. | 713/201 |

* cited by examiner

Primary Examiner—Hussein Elchanti
(74) Attorney, Agent, or Firm—Lee & Hayes, PLLC

(57) ABSTRACT

Various embodiments utilize information contained in a message, such as addressing and other information, to derive a unique identifier. The unique identifier is then used as a means to route an associated message to an appropriate component for processing. In at least some embodiments, the unique identifier is derived using hash-based techniques which are applied to various portions of the message header. Once the hash-based techniques have been used to produce the unique identifier, the unique identifier can be used in a look up process to look for the appropriate component to which the message is to be routed.

17 Claims, 2 Drawing Sheets

EFFICIENT DISPATCH OF MESSAGES BASED ON MESSAGE HEADERS

BACKGROUND

In the computer context, many types of messages that get sent between computing devices typically include some type of header. Included in the header can be information that is used to route the message to the appropriate components that are to process the message. Processing message headers to access and then meaningfully use this routing information can sometimes lead to inefficiencies. For example, often times, using such routing information involves performing string comparisons of the routing information with other information to ascertain how and where to route the message. As will be appreciated by the skilled artisan, doing string comparisons of large numbers of messages, such as those received and routed by web servers, can be a very onerous task.

SUMMARY

Various embodiments utilize information contained in a message, such as addressing and other information, to derive a unique identifier. The unique identifier is then used as a means to route an associated message to an appropriate component for processing. In at least some embodiments, the unique identifier is derived using hash-based techniques which are applied to various portions of the message header. Once the hash-based techniques have been used to produce the unique identifier, the unique identifier can be used in a look up process to look for the appropriate component to which the message is to be routed.

DETAILED DESCRIPTION

Overview

Figure 1:
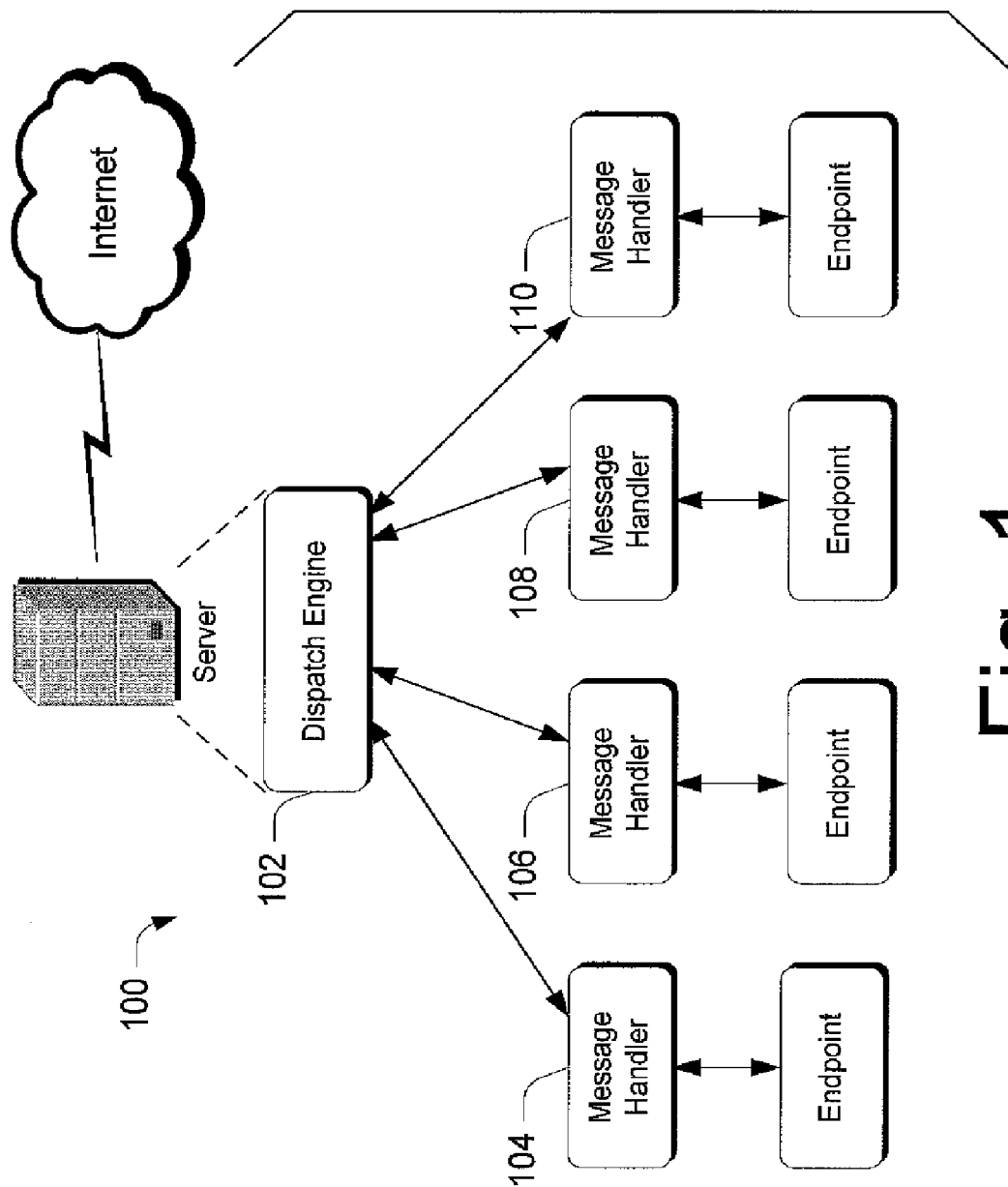
FIG. 1 illustrates but one exemplary system in which various embodiments can be employed.

Various embodiments utilize information contained in a message, such as addressing and other information, to derive a unique identifier. The unique identifier is then used as a means to route an associated message to an appropriate component for processing. In at least some embodiments, the unique identifier is derived using hash-based techniques which are applied to various portions of the message header. Once the hash-based techniques have been used to produce the unique identifier, the unique identifier can be used in a look up process to look for the appropriate component to which the message is to be routed.

In the example that follows, a specific message in the form of a SOAP message is described in a particular context. It is to be appreciated and understood that the techniques described in this document can be applied to other types of messages without departing from the spirit and scope of the claimed subject matter.

Prior to describing the inventive embodiments, however, the following section is provided to give the reader some background context on but one exemplary environment in which the inventive embodiments can be employed.

Web Services Addressing (WS-Addressing) of SOAP Messages to Endpoints

Before describing a specific application of the inventive techniques, consider the following on WS-Addressing.

WS-Addressing provides transport-neutral mechanisms to address Web services and messages. The WS-Addressing specification defines XML [XML 1.0, XML Namespaces] elements to identify Web service endpoints and to secure end-to-end endpoint identification in messages. This specification enables messaging systems to support message transmission through networks that include processing nodes such as endpoint managers, firewalls, and gateways in a transport-neutral manner.

WS-Addressing defines two interoperable constructs that convey information that is typically provided by transport protocols and messaging systems. These constructs normalize this underlying information into a uniform format that can be processed independently of transport or application. The two constructs are endpoint references and message information headers.

A Web service endpoint is a (referenceable) entity, processor, or resource where Web service messages can be targeted. Endpoint references convey the information needed to identify/reference a Web service endpoint, and may be used in several different ways: endpoint references are suitable for conveying the information needed to access a Web service endpoint, but are also used to provide addresses for individual messages sent to and from Web services. To deal with this last usage case the WS-Addressing specification defines a family of SOAP message information headers that allows uniform addressing of messages independent of the underlying transport. These message information headers convey end-to-end message characteristics including addressing for source and destination endpoints as well as message identity.

Both of these constructs are designed to be extensible and re-usable so that other specifications can build on and leverage endpoint references and message information headers.

An endpoint reference includes, among others, the following abstract properties:

[address]: URI (mandatory)
  An address URI that identifies the endpoint. This may be a network address or a logical address.

[reference properties]: xs:any (0 . . . unbounded).
  A reference may contain a number of individual properties that are required to identify the entity or resource being conveyed. Reference identification properties are element information items that are named by Qname (qualified name) and are required to properly dispatch messages to endpoints at the endpoint side of the interaction. Reference properties are provided by the issuer of the endpoint reference and are otherwise assumed to be opaque to consuming applications. The interpretation of these properties (as the use of the endpoint reference in general) is dependent upon the protocol binding and data encoding used to interact with the endpoint.

As an example of an endpoint reference, consider the following:

```
<wsa:EndpointReference xmlns:wsa=". . ."
    xmlns:fabrikam="http://www.fabrikam.org">
  <wsa:Address>uuid:81e40a5e-28bf-4fa2-8521-912a8c5a04c7
  </wsa:Address>
  <wsa:ReferenceProperties>
    <fabrikam:ServiceID>123456789</fabrikam:ServiceID>
    <fabrikam:InstanceID>x12</fabrikam:InstanceID>
  </wsa:ReferenceProperties>
</wsa:EndpointReference>
```

Here, the address consists of the uuid indicated in the Address field. Notice also, that there are two reference properties. A first corresponds to the QNAME "fabrikam:ServiceID", and a second corresponds to the QNAME "fabrikam:InstanceID".

The following example illustrates the use of these mechanisms in a SOAP 1.2 message being sent from http://business456.example/client1 to http://fabrikam123.example/Purchasing:

```
(001) <S:Envelope xmlns:S="http://www.w3.org/2003/05/soap-envelope"
xmlns:wsa="http://schemas.xmlsoap.org/ws/2004/08/addressing">
(002)     <S:Header>
(003)       <wsa:MessageID>
(004)         uuid:6B29FC40-CA47-1067-B31D-00DD010662DA
(005)       </wsa:MessageID>
(006)       <wsa:ReplyTo>
(007)         <wsa:Address>http://business456.example/client1</wsa:Address>
(008)       </wsa:ReplyTo>
(009)       <wsa:To>http://fabrikam123.example/Purchasing</wsa:To>
(010)       <wsa:Action>http://fabrikam123.example/SubmitPO</wsa:Action>
(011)     </S:Header>
(012)     <S:Body>
(013)       ...
(014)     </S:Body>
(015) </S:Envelope>
```

Lines (002) to (011) represent the header of the SOAP message where the mechanisms defined in the specification are used. The body is represented by lines (012) to (014).

Lines (003) to (010) contain the message information header blocks. Specifically, lines (003) to (005) specify the identifier for this message and lines (006) to (008) specify the endpoint to which replies to this message should be sent as an Endpoint Reference. Line (009) specifies the address URI of the ultimate receiver of this message. Line (010) specifies an Action URI identifying expected semantics.

Thus, the WS-Addressing defines a standardized mechanism for addressing SOAP messages to endpoints, as well as provides the ability to identify an action (intended purpose) of the message.

To send a SOAP message to the endpoint represented by the endpoint reference, a transformation that is described in the WS-Addressing specification in the section entitled "Binding Endpoint References" is used. More specifically, when a message needs to be addressed to the endpoint, the information contained in the endpoint reference is mapped to the message according to a transformation that is dependent on the protocol and data representation used to send the message. Protocol-specific mappings (or bindings) will define how the information in the endpoint reference is copied to message and protocol fields.

The SOAP binding for endpoint references is defined by the following two rules:

- The [address] property in the endpoint reference is copied in the [destination] header field of the SOAP message.
- Each [reference property] and [reference parameter] element becomes a header block in the SOAP message. The element information item of each [reference property] or [reference parameter] (including all of its [children], [attributes] and [in-scope namespaces]) is to be added as a header block in the new message.

As an example using the endpoint reference given above, consider the following SOAP message with the Action "hffp://www.fabrikam.org/GetServiceInformation" which is to be sent to this endpoint:

```
<S:Envelope xmlns:S="http://www.w3.org/2003/05/soap-envelope"
        xmlns:wsa="..." xmlns:fabrikam="http://www.fabrikam.org">
    <S:Header>
        ...
    <wsa:To>uuid:81e40a5e-28bf-4fa2-8521-912a8c5a04c7</wsa:To>
    <fabrikam:ServiceID>123456789</fabrikam:ServiceID>
```

-continued

```
    <fabrikam:InstanceID>x12</fabrikam:InstanceID>
    <wsa:Action>http://www.fabrikam.org/GetServiceInformation
    </wsa:Action>
        ...
    </S:Header>
    <S:Body>
        ...
    </S:Body>
</S:Envelope>
```

From the above, as will be appreciated by the skilled artisan, the following observations can be made. First, messages for many different endpoints can be sent to the same network protocol address. Thus, the SOAP headers must then be examined and the message internally dispatched to the piece of software represented by the endpoint reference—referred to as the "message handler" in this document. Second, the order of SOAP headers are arbitrary. Third, endpoint references can have a varying number of reference properties, including zero. Fourth, not all reference properties are relevant for internal routing. That is, a subset of reference properties may be used for routing, and the rest may be used by the message handler for internal purposes.

EXEMPLARY EMBODIMENT

In the context of the WS-Addressing environment described above, the embodiments described below provide a way to efficiently route incoming messages to a large number of message handlers, each with its own endpoint reference, possibly with multiple reference properties.

In one embodiment, a software entity in the form of a dispatch engine is provided. Message handlers for different endpoints register their endpoint reference with the dispatch engine. As an example, consider FIG. 1 which shows a system, generally at 100, that includes a dispatch engine 102 comprising part of a server, and multiple different message handlers 104, 106, 108, 110, each with its own endpoint for which it will register, with dispatch engine 102, an appropriate endpoint reference.

The servers of which dispatch engine comprises a part, typically includes one or more processors, one or more computer-readable media and computer-readable instructions on the computer-readable media which, when executed by the processor(s), can perform the functionality described below. The server typically receives the messages upon which it operates via a network, such as the Internet.

Registration

During registration, individual message handlers provide the dispatch engine (or registration function or process) with a number of parameters to help the dispatch engine dispatch messages that are received. In one embodiment, the following parameters are registered with the dispatch engine.

First, a mechanism is provided to enable invocation of the message handler. This can and typically does take the form of a function pointer or delegate. Second, the message handler provides a representation of the endpoint reference for the message handler. In this embodiment, the representation takes the form of the address and reference properties to be used for routing of the endpoint reference. Third, the message handler provides a mechanism for identifying the reference properties that apply to the endpoint reference. Typically this can take the form of a list of QNAMEs or objects that ultimately represent the QNAMEs. Finally, the message handler provides, for each reference property type $r_t$, a hash function $f_t$ to calculate hash values for the reference property. $f_t$ will typically represent the type of the reference property as well as its value.

As an aside, as will be appreciated by the skilled artisan, a hash function maps keys to integers usually to get an even distribution on a set of smaller values. For the purposes of this discussion, a hash function $h(x)$ has the properties that for any keys $x \neq y$, there is a very high probability that $h(x) \neq h(y)$. There are many well known hash functions for hashing strings or lists of integer values. Many of them are described in the literature and are in the public domain. As such, hash functions are not described here in greater detail. Further, a hash table is a data structure that maps keys to values in (near) constant time. It is a very efficient mechanism for finding a value given its key.

Continuing, having been provided with the above information, the dispatch engine or registration function computes a unique identifier for the endpoint reference and performs a couple of other tasks.

In one embodiment a unique identifier for the endpoint reference can be computed as follows. At some point in the computation of the unique identifier, a hash of the representation for the endpoint reference is computed. In the above example, the representation resides in the form of the data appearing in address field of the endpoint reference—the uuid. Thus, in the above example, a hash of the following is computed:

uuid: 81e40a5e-28bf-4fa2-8521-912a8c5a04c7

In addition, for each of the reference properties for the endpoint reference, a hash is computed using the hash function that was provided during registration.

Thus, in the above example, a hash of "123456789" is computed using the hash function for the reference property type <fabrikam:ServiceID>, and a hash of "x12" is computed using the hash function for the reference property type <fabrikam:InstanceID>.

Each of the hashes of the reference properties are then mathematically combined as by being XOR'd together. By XOR'ing the hashes of the reference properties, any order dependencies are removed, as will be appreciated by the skilled artisan.

The resultant value of the XOR operation is then hashed, together with the hash of the endpoint representation to provide the unique identifier for the endpoint reference.

Once the unique identifier is computed, the registration function uses the unique identifier as an index to the mechanism that identifies the appropriate message handler for the message. In one embodiment, this index is manifest in a hash table that is built during the registration process. Hence, at this point, the registration process has computed a unique identifier for the endpoint reference, as well as built an association between the unique identifier and the pointer to the appropriate message handler. In addition, the registration process also builds an association between the individual reference property types and their associated hash functions. In one embodiment, this association is manifest in a different hash table. Both of these tables will later be used for message dispatch.

Specifically, the hash table that associates individual reference property types with hash functions will be used to acquire the appropriate hash function to use on the appropriate instances of the reference property types that are encountered in a received message. The hash table that associates the unique identifier with the message handlers will be used to ascertain, for a given message, the appropriate message handler to which the message is to be routed.

Mathematically, one way of representing the above process is as follows:

Let:

e be the hash value for the endpoint reference $h(x, y)$ is a hash function to hash a list of integers one at a time.

$a(x)$ is a hash function to hash a URI.

$t(x)$ is a hash function to hash a QNAME.

u the URI from the Endpoint Reference's address property.

e is typically a 32 or 64 bit value.

Hash calculation:

$e=0$

For each reference property $r_i$ of type $r_t$ $e = e \text{ XOR } f_t(r_i)$ e $h=(e, a(u))$ As noted above, the registration fraction uses e as the key to save the endpoint reference, as well as the fraction pointer in a hash table, referred to as HT1. Hash table HT1 is the table that is used to ascertain the appropriate message handler for a given endpoint reference. In addition, the registration function also adds the function pointer for $f_t$ to a hash table, using $t(r_t)$ as the key, referred to as is table HT2. Here, $t(r_t)$ constitutes the hash of the QNAME of the reference property type. This second hash table enables the appropriate hash function for a given instance of a property type to be ascertained.

Message Dispatch

When a message arrives for internal routing, the following process takes place in accordance with one embodiment. Typically, this process can be implemented by a dispatch engine or some other component.

First, from the message header, the address of the endpoint is identified. In the above example, the address is ascertained from the "To" field and constitutes the address of the endpoint. In the example above, the address is as follows:

uuid: 81e40a5e-28bf-4fa2-8521-912a8c5a04c7

For each SOAP header that appears in the message, a hash of the QNAME is computed and used as an index into hash table HT2 to find the appropriate hash function for the reference property type. In the above example, a hash is computed for both <fabrikam:ServiceID> and <fabrikam:InstanceID>. These hashes are used as an index into hash table HT2 to ascertain the hash functions that are associated with each SOAP header type. Once the hash functions for the individual SOAP header types are ascertained, the individual hash functions can be used to compute a hash of the associated SOAP header.

In the above example, once the hash function for the SOAP header type <fabrikam:ServiceID> has been ascertained, it can be used to compute a hash of "123456789"; likewise, once the hash function for the SOAP header type <fabrikam:InstanceID> has been ascertained, it can be used to compute a hash of "x12". If a hash for a particular SOAP header type is not found, then it can be skipped. These SOAP header hashes are then mathematically combined as by being XOR'ed together, and the final XOR'ed value is hashed, together with a hash of the <wsa: To> header to provide a unique identifier for the endpoint that is the intended recipient of the message.

This unique identifier can then be used as an index into hash table HT1 to ascertain the appropriate message handler to which the message is to be routed. Specifically, the unique identifier can now be used to lookup the function pointer to the appropriate message handler.

Mathematically, one way of representing this process, using the definitions provided just above, is as follows:

When a message arrives for internal routing the following steps take place:

e=0
for each SOAP header $h_i$.
If the header is wsa:To then
    u =URI of the To header
Else
    calculate $t(h_i)$ and use the value to lookup $f_t$ in HT2
    if $f_t$ is found in HT2 then
        e =e XOR $f_t(h_i)$
e=h(e, a(u))
Note that if $t(h_i)$ is found in HT2 then $h_i$ =some $r_i$, Now use e to lookup the function pointer and endpoint reference in HT1 and compare the actual endpoint reference to the SOAP message headers and fail the dispatch if they do not match.

Extensions

Recall from the above discussion that a SOAP message of the type described above can also indicate an action associated with the message. In these instances, such actions can form an additional basis by which a message can be routed to a message recipient.

As an example, consider the following. In some situations it may be desirable to dispatch on the combination of endpoint reference as well as the action to be performed. In this case, the registration process can also accept the URI of the Action header. When the hash value e is calculated (as indicated above) during registration and dispatch, the hash value can be calculated to include the action, mathematically represented as e =h(e, a(w)), where a(x) is a hash function to hash the URI value of the Action header and w is the URI value of the Action Header.

In this case, message dispatch is performed based on the action that appears in the message, and not just based only on the message handler for handling such messages.

Different Ordering of Hashes

Note also that, in the above-described embodiment, it is possible to change the ordering of the hash operations, as long as the same order of hashing (excluding the XOR order of course) is performed during registration and dispatch. In this manner, the final outcome is not affected.

In Operation

Figure 2:
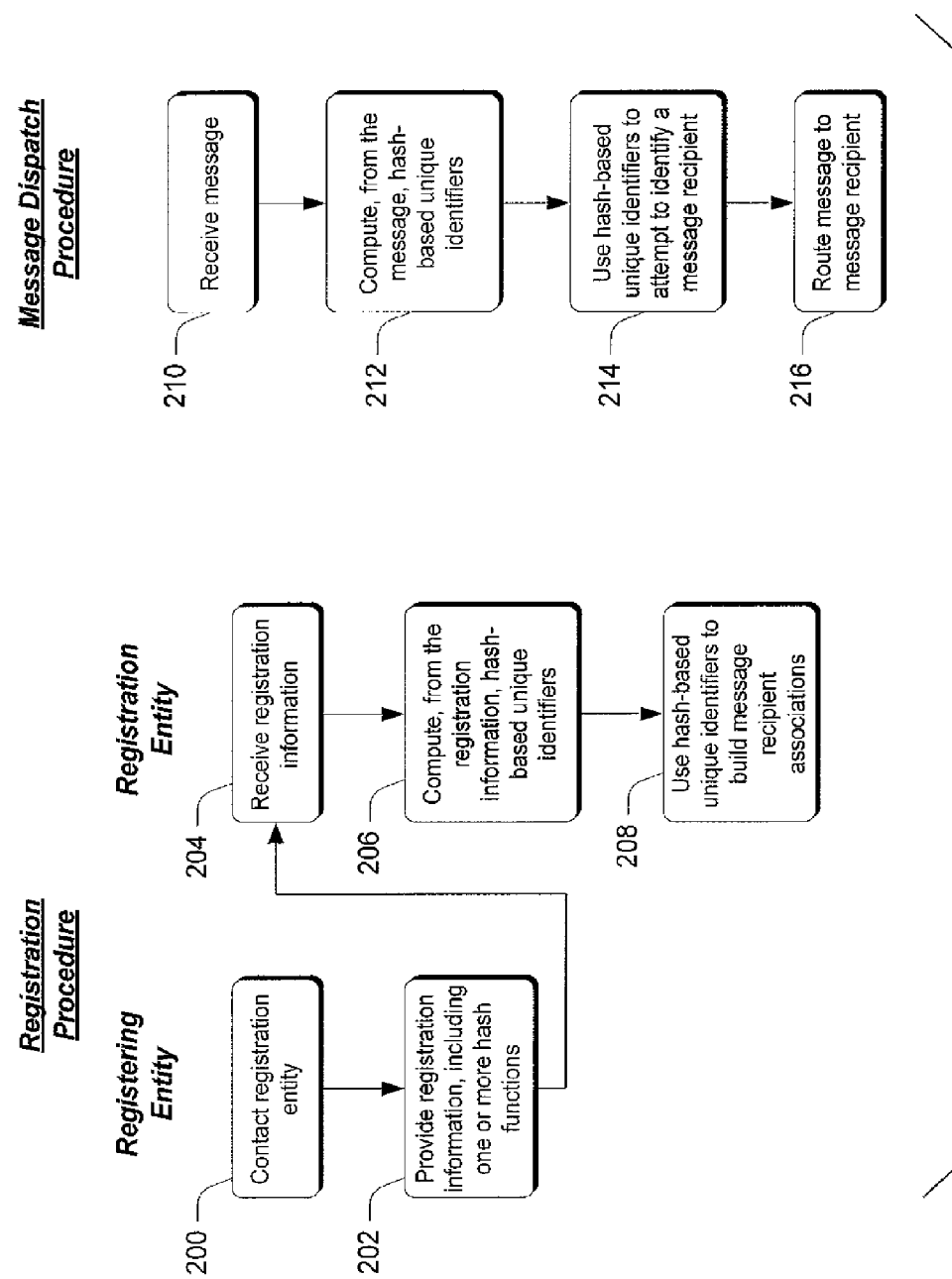
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In one embodiment, the method can be implemented in software that resides in the form of computer-readable instructions that are embodied on a computer-readable medium.

Notice that the flow chart of FIG. 2 includes two main portions—one designated "Registration Procedure" and the other designated "Message Dispatch Procedure". In addition, under the "Registration Procedure" designation, two sub-portions appear and are designated to identify those entities that might perform the steps. For example, under the designation "Registering Entity" appears steps that can be executed by an entity that attempts to register with a "Registering Entity". A "Registering Entity" can comprise any suitable type of entity, with a message handler constituting but one example of such an entity. Likewise, a "Registration Entity" can constitute any suitable type of entity, with a dispatch engine constituting but one example of such an entity.

Step 200 contacts a registration entity for the purpose of registering information that will be used to route messages to the appropriate message recipient. Step 202 provides registration information, including one or more hash functions, to the registration entity. Any suitable type of registration information can be provided, examples of which are given above.

Step 204 receives the registration information and step 206 computes, from the registration information, hash-based unique identifiers. Any suitable types of hash-based unique identifiers can be computed, examples of which are given above. Step 208 uses the hash-based unique identifiers to build message recipient associations. Any suitable types of associations can be used. In the example given above, hash tables are used to build associations between unique identifiers and associated message recipients, as well as between various property types and associated hash functions. Other types of structures can, however, be used such as sorted lists or other types of dictionaries.

Having completed the registration procedure, we move now to the message dispatch procedure. Accordingly, step 210 receives a message. Any suitable message or message type can be received. In the example provided above, the message resides in the form of a SOAP message that utilizes WS-Addressing. It is to be appreciated and understood that other types of messages can be received without departing from the spirit and scope of the claimed subject matter.

Step 212 computes, from the message, hash-based unique identifiers. In at least one embodiment, this step is designed to produce hash-based unique identifiers that can be used to ascertain an intended message recipient. Accordingly, step 214 uses the hash-based unique identifiers to attempt to identify a message recipient. In this particular example, this step can be performed by using the hash-based identifiers, in combination with the associations built in step 208, to identify an intended message recipient.

If the hash-based identifiers are used to successfully identify an intended recipient, step 216 routes the message to the intended message recipient, otherwise the message dispatch fails.

CONCLUSION

Various embodiments utilize a message's header to derive, from addressing and other information, a unique identifier.

The unique identifier is then used as a means to route an associated message to an appropriate component for processing, In at least some embodiments, the unique identifier is derived using hash-based techniques which are applied to various portions of the message header. Once the hash-based techniques have been used to produce the unique identifier, the unique identifier can be used in a look up process to look for the appropriate component to which the message is to be routed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media storing computer-readable instructions which, when executed, implement a method comprising:
   receiving registration information from a computer entity, the registration information being intended for use in routing received messages to an endpoint having an endpoint reference, wherein the registration information includes address information associated with the endpoint reference, one or more reference property types that comprise part of a message, and, for each individual reference property type of the one or more reference property types, a hash function that is to be used in conjunction with the reference property types;
   using hash-based techniques to create a unique identifier for the endpoint reference;
   associating the unique identifier with a message handler for the individual endpoint reference;
   building an association between the individual reference property types and associated hash functions: and
   receiving the message;
   identifying the individual reference property types contained in the message;
   identifying, from said association between the individual reference property type and associated hash functions, one or more hash functions;
   hashing, using the identified one or more hash functions, second reference properties of an associated individual reference property type;
   mathematically combining the second reference property hashes;
   hashing address information contained in the message;
   hashing the hashed address information contained in the message together with the second combined reference property hashes to create an identifier;
   using the created identifier to identify, from said association of the unique identifier and the message handler, a corresponding unique identifier; and
   routing the message to a corresponding message handler.

2. The computer-readable media of claim 1, wherein the step of identifying reference property types comprises a list of qualified names of the individual reference property types.

3. The computer-readable media of claim 1, wherein the messages comprise SOAP messages.

4. The computer-readable media of claim 3, wherein the SOAP messages utilize Web Service (WS) Addressing.

5. The computer-readable media of claim 1 further comprising providing, as part of the registration information, an action that can be associated with a particular message.

6. A computer-implemented method comprising:
   receiving registration information from a computer entity, the registration information being intended for use in routing received messages to an endpoint having an endpoint reference, wherein the registration information includes address information associated with the endpoint reference, one or more reference property types that comprise part of a message, and, for each individual reference property type of the one or more reference property types, a hash function that is to be used in conjunction with the reference property types;
   using hash-based techniques to create a unique identifier for the endpoint reference;
   associating the unique identifier with a message handler for the individual endpoint reference;
   building an association between the individual reference property types and associated hash functions: and
   receiving the message;
   identifying the individual reference property types contained in the message;
   identifying, from said association between the individual reference property type and associated hash functions, one or more hash functions;
   hashing, using the identified one or more hash functions, second reference properties of an associated individual reference property type;
   mathematically combining the second reference property hashes;
   hashing address information contained in the message;
   hashing the hashed address information contained in the message together with the second combined reference property hashes to create an identifier;
   using the created identifier to identify, from said association of the unique identifier and the message handler, a corresponding unique identifier; and
   routing the message to a corresponding message handler.

7. The method of claim 6, wherein said registration information resides in the message's header.

8. The method of claim 7, wherein said registration information comprises address information.

9. The method of claim 7, wherein said registration information comprises reference property information.

10. The method of claim 7, wherein said registration information comprises action information.

11. The method of claim 7, wherein the message comprises a SOAP message.

12. A computer-implemented method comprising:
   receiving registration information from a computer entity, the registration information being intended for use in routing received SOAP messages to an endpoint having an endpoint reference, wherein the registration information includes address information associated with the endpoint reference, one or more reference property types that comprise part of a message, and, for each individual reference property type of the one or more reference property types, a hash function that is to be used in conjunction with the reference property types;
   using hash-based techniques to create a unique identifier for the endpoint reference;
   associating the unique identifier with a message handler for the individual endpoint reference;
   building an association between the individual reference property types and associated hash functions: and
   receiving the message;
   identifying the individual reference property types contained in the message;

identifying, from said association between the individual reference property type and associated hash functions, one or more hash functions;

hashing, using the identified one or more hash functions, second reference properties of an associated individual reference property type;

mathematically combining the second reference property hashes;

hashing address information contained in the message;

hashing the hashed address information contained in the message together with the second combined reference property hashes to create an identifier;

using the created identifier to identify, from said association of the unique identifier and the message handler, a corresponding unique identifier; and routing the message to a corresponding message handler.

13. The method of claim 12, wherein the act of using hash-based techniques comprises hashing, using an associated hashing function, first individual reference properties of an associated reference property type and mathematically combining the first reference property hashes.

14. The method of claim 13, wherein the act of mathematically combining comprises XOR'ing the reference property hashes.

15. The method of claim 13, wherein the act of using hash-based techniques further comprises:
hashing the address information; and
hashing the hashed address information together with the first combined reference property hashes to create the unique identifier.

16. The method of claim 15, wherein the act of using hash-based techniques further comprises hashing action information together with the unique identifier to create a different unique identifier.

17. The method of claim 12, wherein the act of building an association between individual reference property types and associated hash functions comprises creating a hash table that defines the associations.

\* \* \* \* \*